(No Model.)

E. ROBINSON.
Manufacture of Steel Scoops.

No. 234,892. Patented Nov. 30, 1880.

Witnesses.
Chas. T. Robinson
M. Wastcoat

Inventor.
Enoch Robinson
by Herman Kane
Attorneys.

N. PETERS, PHOTO-LITHOGRAPHER, WASHINGTON, D. C.

UNITED STATES PATENT OFFICE.

ENOCH ROBINSON, OF RAYNHAM, ASSIGNOR TO OLD COLONY IRON COMPANY, OF TAUNTON, MASSACHUSETTS.

MANUFACTURE OF STEEL SCOOPS.

SPECIFICATION forming part of Letters Patent No. 234,892, dated November 30, 1880.

Application filed June 30, 1880. (No model.)

*To all whom it may concern:*

Be it known that I, ENOCH ROBINSON, of Raynham, in the county of Bristol and Commonwealth of Massachusetts, have invented a new and useful Improvement in the Manufacture of Steel Scoops, of which the following is a specification.

The objects of my invention are: first, to provide dies of a novel construction for the purpose of holding and maintaining the shape of a steel scoop-blade under pressure during the process of welding, and for shaping the socket-portion of the front and back straps to the configuration of the base of a handle; and, second, to provide a new method of welding a steel scoop-blade to the handle-straps by means of dies under pressure, and by the same method to so maintain the shape of the blade and handle-straps that on the release of the article from the dies it will form a complete scoop ready for the polisher and for the insertion of the handle.

Heretofore in the manufacture of shovels, a machine has been constructed having rotating or reciprocating rocking dies for the purpose of welding a single strap onto a shovel blank or blade; but such construction in practice is objectionable in that the shape of the blade is liable to be materially affected by twisting, warping, or curling in its progress through the dies, and but one strap at a time can be put on by this method. Also, dies in connection with a mandrel have been made for the special purpose of shaping the straps of a shovel or scoop for the introduction of the handle after the blade of the shovel or scoop with its straps has been completed under the common method of manufacture. This latter method has no relation to the welding process effected by my improvement.

My invention consists in the method of attaching the straps to the scoop-blade, the same consisting in heating the parts for union to a welding-heat, then arranging them in the dies with a mandrel between the straps, and finally subjecting the parts to pressure for the union.

My invention also consists in a novel construction and arrangement of the parts—lower and upper dies—as hereinafter more fully will be set forth and claimed.

Figure 1:
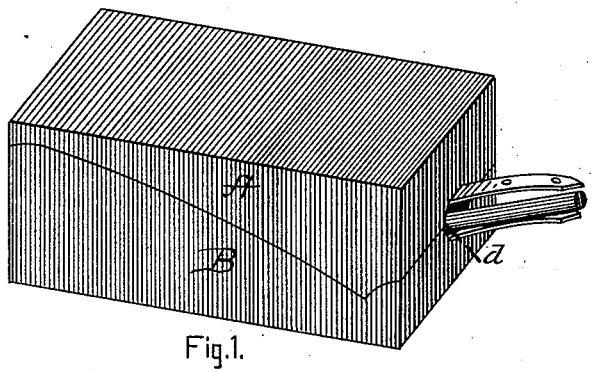
Figure 2:
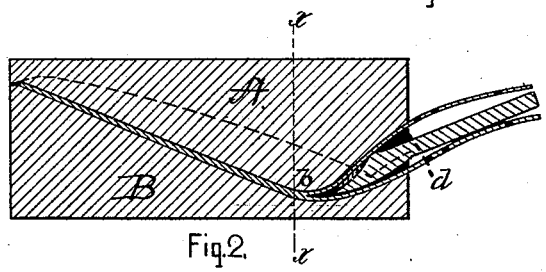
Figure 3:
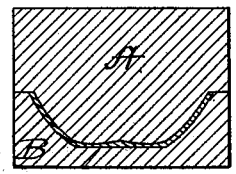
Figures 4, 5:
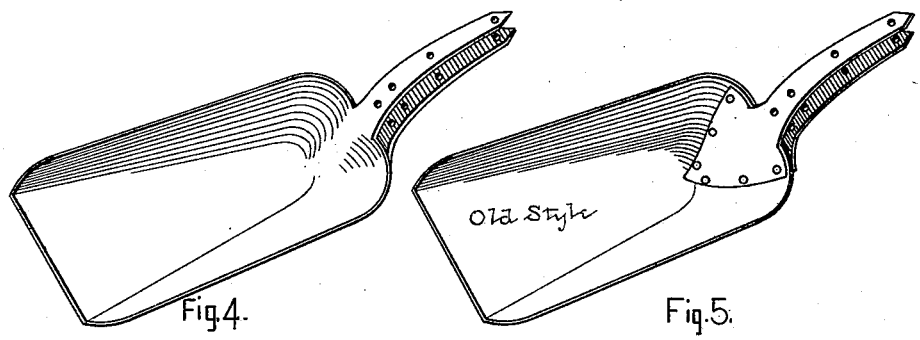
Figures 6, 7, 8:
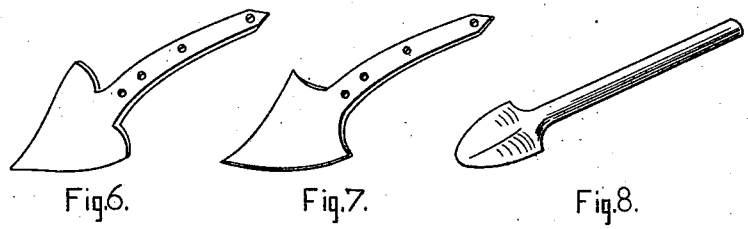

In the accompanying drawings, making a part of this specification, Figure 1 is an isometrical projection of the upper and lower dies containing the scoop-blade, straps, and mandrel all in position for welding. Fig. 2 is a vertical longitudinal central sectional view of the dies, showing the position of the scoop-blade, straps, and mandrel. Fig. 3 is a transverse sectional view of the dies and scoop in position. Fig. 4 is a perspective view of my improved scoop, showing the straps welded thereto and shaped to receive a handle. Fig. 5 is a perspective view of a scoop, showing the straps riveted thereto as in the old method. Figs. 6 and 7 are perspective views of the upper and lower straps, and Fig. 8 is a representation of a steel mandrel employed during the process of welding, for shaping the upper and lower strap-plates to the form of the base of the handle.

The nature and operation of my invention will be readily understood from examination of the foregoing premises in connection with the following details of the description and method of operation.

The dies or formers are made of proper metal, and consist of upper and lower dies, A and B, matching in conformation as to the full outline of the blade of the scoop to or about the point $b$, at or near the base of the bowl or heel of the blade, where the configuration of each die diverges from the plane of contact and conforms, respectively, to the outline of the front and back strap-plates, allowing sufficient space $d$ for the projection of the ends of the handle-straps with the steel mandrel between them, substantially as shown in Figs. 1 and 2 of the drawings. To effect the weld of the straps to the scoop-blade, and to maintain the shape of the straps to the outline of the handle-bulge the dies are made ready. The blank for the scoop, having been cut out in proper shape from a flat piece of steel of required thickness, and having a slit extending the proper distance in the plate and falling directly under the center of the upper strap, is then heated and made in scoop-shape by means of dies. The straps, also, are each cut out, and, being heated, are put in shape by means of dies suited to the purpose. The bowl and straps are now placed in proper position and secured together by two rivets put near the edge of the straps on opposite sides, and through the straps and scoop-blade. The parts are then heated to a welding-heat, placed in the dies A B, with the mandrel or former between the strap-plates, and the dies subjected to pressure, which may be applied by any means affording sufficient force to make a true weld. The result of this operation is a scoop having the front and back straps smooth with the plate of the scoop, and forming an integral part thereof. After the weld is effected the upper die is removed and the scoop taken out in condition for the polisher and ready for the handle.

Having thus described my invention, what I claim as my invention, and desire to secure by Letters Patent, is—

1. In manufacturing steel scoops, the method of attaching the straps to the scoop-blade, which consists in heating the parts for union to a welding-heat, then arranging them in the dies with a mandrel between the strap-plates, and finally subjecting them to pressure, substantially as set forth.

2. Dies for maintaining or preserving the shape of the steel scoop during the process of welding the straps thereto, consisting of the upper and lower dies, A and B, matching in conformation as to the full outline of the blade of the scoop to the base of the heel of the blade, and conforming to the outline of the front and back handle strap-plates, with an opening for the end projections of the straps, as shown and described.

ENOCH ROBINSON.

Witnesses:
CHAS. T. ROBINSON,
M. WASTCORT.